(12) United States Patent
Macmanus et al.

(10) Patent No.: US 8,657,372 B2
(45) Date of Patent: Feb. 25, 2014

(54) VEHICLE SEAT

(75) Inventors: Steve Macmanus, Warwick (GB); Andrew Downie, Sandbach (GB); Paul Sharman, Hinkley (GB); Nicholas Stapleton, Nantwich (GB)

(73) Assignee: Bentley Motors Limited (GB)

( * ) Notice: Subject to any disclaimer, the term of this patent is extended or adjusted under 35 U.S.C. 154(b) by 323 days.

(21) Appl. No.: 13/054,829

(22) PCT Filed: Jul. 17, 2009

(86) PCT No.: PCT/GB2009/001776
§ 371 (c)(1),
(2), (4) Date: Jan. 19, 2011

(87) PCT Pub. No.: WO2010/010328
PCT Pub. Date: Jan. 28, 2010

(65) Prior Publication Data
US 2011/0140485 A1 Jun. 16, 2011

(30) Foreign Application Priority Data
Jul. 19, 2008 (GB) .................................. 0813269.8

(51) Int. Cl.
*B60N 2/42* (2006.01)
(52) U.S. Cl.
USPC ................................. 297/216.13; 297/216.1

(58) Field of Classification Search
USPC .................. 297/216.1, 216.13, 216.16, 480
See application file for complete search history.

(56) References Cited

U.S. PATENT DOCUMENTS

| 4,676,556 | A | * | 6/1987 | Yamanoi et al. | 297/473 |
| 5,163,735 | A | * | 11/1992 | Aljundi | 297/378.11 |
| 5,460,429 | A | * | 10/1995 | Whalen | 297/378.11 |
| 6,502,903 | B2 | * | 1/2003 | Bruck et al. | 297/378.11 |
| 6,786,543 | B2 | * | 9/2004 | Andersson et al. | 297/216.13 |
| 6,921,133 | B2 | * | 7/2005 | Taoka et al. | 297/216.16 |
| 7,044,543 | B2 | * | 5/2006 | Schumann et al. | 297/216.1 |
| 2001/0045766 | A1 | * | 11/2001 | Deptolla | 297/216.2 |
| 2003/0160483 | A1 | * | 8/2003 | Becker et al. | 297/216.16 |

FOREIGN PATENT DOCUMENTS

DE 10 2006 055 267 5/2008
WO 01/96141 12/2001

* cited by examiner

*Primary Examiner* — Philip Gabler
(74) *Attorney, Agent, or Firm* — Salter & Michaelson

(57) ABSTRACT

A vehicle seat including at least two components connected, directly or indirectly, by an adjustment mechanism. A locking means is provided, arranged to lock the two components relative to each other when predetermined conditions are experienced, to restrict relative movement of the two components. The locking means may be arranged to engage when a vehicle in which the seat is mounted is involved in an impact. The locking means reduces the amount of relative movement of seat components owing to compliance in seat adjustment mechanism in the event of a vehicle impact.

20 Claims, 3 Drawing Sheets

VEHICLE SEAT

TECHNICAL FIELD

The present invention relates to a vehicle seat, and particularly but not exclusively to an automotive vehicle seat.

BACKGROUND OF THE INVENTION

Automotive vehicle seats typically provide for a whole range of adjustments aimed at enhancing occupant comfort and safety. These adjustments typically include forwards and backwards movement to enable the position of the seat on the longitudinal axis of a vehicle to be adjusted, upward and downward movement to enable the position of the seat on the vertical axis of a vehicle to be adjusted and pivotal movement of a seat squab part relative to the cushion part to enable rake of the squab relative to the seat to be adjusted.

The mechanisms inherent to the provision of these adjustments impart a degree of play or compliance to a seat. This presents a problem under vehicle impact conditions in that movement of a seat relative to a vehicle as a result of compliance in its adjustment mechanisms will contribute to movement of an occupant of the seat relative to the vehicle during impact conditions. This movement generally counters the intended effects of safety devices such as seat belts and airbags intended to restrain and control movement of vehicle occupant during an impact and can therefore increase the risk of an occupant incurring an injury.

As automotive vehicle seats have become more complex so their mass has increased and this exacerbates the problem since the increased mass results in increased forces being generated by the seat when a vehicle is involved in an impact. The problem is further exacerbated where a vehicle seat is provided with an integrated seat belt mounted on the seat rather than directly to the vehicle. With this arrangement force applied to the seat belt by an occupant during a vehicle impact is transmitted to the vehicle seat rather than directly to the vehicle. This further increases the load upon the seat and generates further movement of the seat relative to the vehicle.

Embodiments of the present invention have been made in consideration of these problems.

SUMMARY OF THE INVENTION

According to the present invention there is provided a vehicle seat comprising at least two components connected, directly or indirectly, by an adjustment mechanism enabling adjustment of the relative positions of the two components, wherein at least one locking means is provided arranged to lock the two components relative to each other when predetermined conditions are experienced, thereby restricting relative movement of the two components.

Preferably the locking means is arranged to engage in the event of a vehicle on which the seat is mounted being involved in an impact. This may be characterised by deceleration of the vehicle at a rate greater than a predetermined value. Thus, the locking means will be activated to limit relative movement of components of the vehicle seat in a vehicle impact. The locking means may be resiliently biased against engagement, for example by a spring.

The locking means may be provided between any two relatively adjustable components of the seat. More than one locking means may be provided on the vehicle seat. For example, one or more locking means could be provided between any two of the following seat components: seat squab, seat cushion, moveable rail and fixed rail. One of the seat components may be fixed relative to the vehicle.

The locking means may be separate to the adjustment mechanism. Alternatively, the locking means may form part of the adjustment mechanism.

The locking means may comprise two mutually engageable components mounted respectively to the two seats components. One component could comprise teeth, and the other a pawl or teeth.

The locking means may be activated by any suitable arrangement. In one embodiment a component of the locking means is connected to a seat belt anchorage and the locking means is arranged to lock when a force applied to the seat belt anchorage by a seat belt exceeds a predetermined threshold. In another embodiment a component of the locking means is arranged to move from a first position to a second position as a result of inertial forces acting on the mass of the component resulting from deceleration of the vehicle in an impact, and movement of the component causing the locking means to lock. Other arrangements are, of course, possible. For example the locking means could be brought into operation by an actuator under control of an electronic control unit programmed to determine deployment of the locking means in dependence upon impact conditions as sensed by one or more impact sensors.

The locking means may be arranged to continue to lock the two components relative to each other even though the predetermined conditions no longer apply.

Means may be provided to release the locking means, to enable relative movement of components of the seat following an impact.

DESCRIPTION OF THE DRAWINGS

In order that the invention may be more clearly understood embodiments thereof will now be described, by way of example, with reference to the accompanying drawings of which.

DETAILED DESCRIPTION

Figure 1:
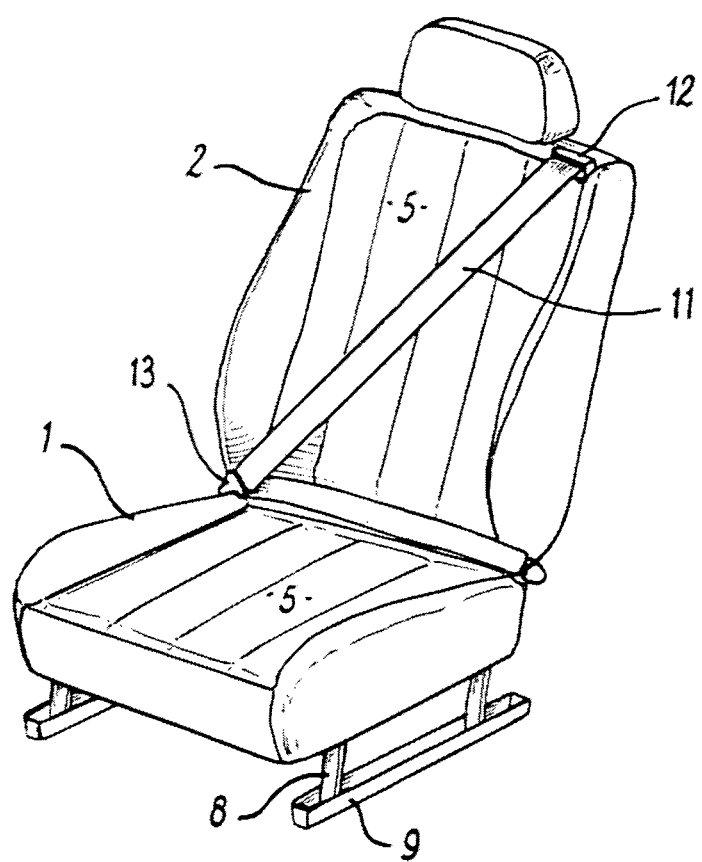
FIG. 1 shows a diagrammatic perspective view of a vehicle seat according to the invention.

Referring to the figures an automotive vehicle seat comprises a cushion part 1 and a squab part 2, each having respective metal frames 3, 4 supporting upholstery 5.

The cushion 1 and squab 2 are pivotally connected together by a pivot 6 enabling the rake of the squab relative to the cushion 1 to be adjusted. A mechanism is provided to one side of the seat for adjustment of the rake of the squab 2.

The cushion frame 3 is mounted by way of a height adjustment mechanism, generally 7, to a moveable slide 8. The moveable slide 8 is slidably mounted on a fixed slide 9 which is in turn fixed to the vehicle floor. The moveable and fixed slide arrangement allows fore and aft movement of the seat relative to the vehicle. The height adjustment mechanism provides for heightwise movement of the seat relative to the floor and roof of the vehicle. The seat is shown in a fully raised position in FIG. 2, a fully lowered position in FIG. 4 and an intermediate position in FIG. 3.

The seat includes a seat belt comprising a webbing strap 11. The seat belt is shown in a fastened state in FIG. 1, although no occupant is shown in the seat. The webbing is stored on a conventional reel housed in the seat squab 2 and pays out of an opening 12 towards the top of the seat squab 2 and can be drawn in a diagonal fashion across an occupant of the seat so that a fitting 13 slidably mounted on the webbing 11 can be engaged into a latch fastened to an anchor point towards the bottom of the squab and on the opposite side of the squab to the aperture 12 through which the webbing strap 11 is paid out. The webbing strap 11 continues from the fastening to an anchor point 14 on the cushion frame 3. The reel is of the 'inertia' type and arranged to lock under impact conditions to prevent further retraction of the seat belt from the reel and thus restrain movement of the seat occupant.

The seat belt anchor point 14 is provided on a locking member 15 comprising a metal plate mounted on the cushion frame 3 by a pivot 16 enabling the locking member to rotate relative to the cushion frame 3. Under normal circumstances rotation of the locking member is inhibited by a resilient member, in this case a helical tension spring, 17 extending from the seat belt anchor point 14 on the locking member 15 to the cushion frame 3. The locking member 15 is arranged such that a force, which exceeds a predetermined threshold, exerted on the seat belt by an occupant during rapid deceleration of the vehicle when the seat belt reel has locked, in particular as a result of an impact, will cause the locking member 15 to rotate in an anti-clockwise direction (as viewed in FIGS. 2 to 5) against the action of the resilient member 17. The general direction of a force applied to the seat belt anchor point 14 as a result of a vehicle impact is shown by arrow 18 in FIG. 5.

The locking member 15 has a toothed edge 19 and is intended to cooperate with a locking rack 20. The locking rack 20 is mounted by way of a pivot 21 to the moveable slide 8 of the seat. The locking rack 20 is generally elongate and curved with a toothed edge 22. The locking rack 20 is connected at one end to the pivot 21 and extends upwardly from the pivot with its toothed edge facing the toothed edge 19 of the locking member 15.

Figure 5:
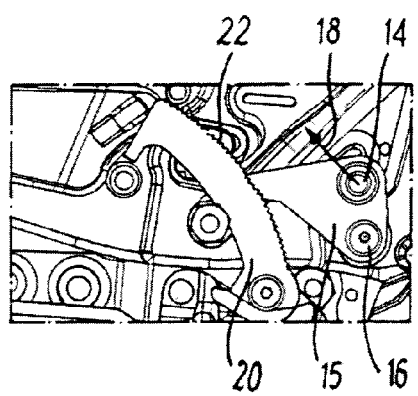
FIG. 5 shows a detailed view of the locking means shown in FIGS. 2 to 4 in a locked state.

A guide bracket 23 is also mounted to the cushion frame 3 (not shown in FIG. 5). The guide bracket is arranged to support the locking rack 20 against the effects of gravity so that the toothed edge of the locking rack 20 remains a predetermined distance from the toothed edge 19 of the locking member 15 throughout the full range of height adjustment of the seat.

Figure 2:
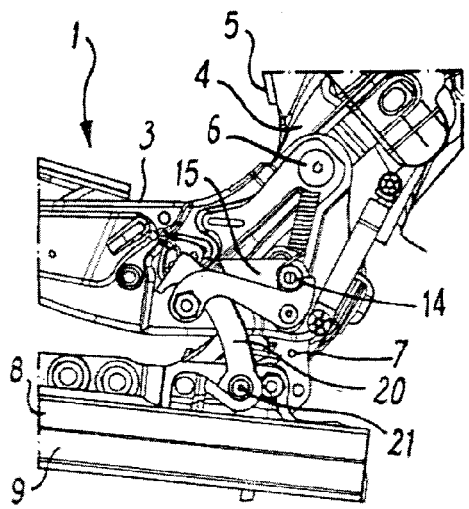
FIG. 2 shows a partial cut-away left side view of the seat of FIG. 1 in a fully raised position.
Figure 3:
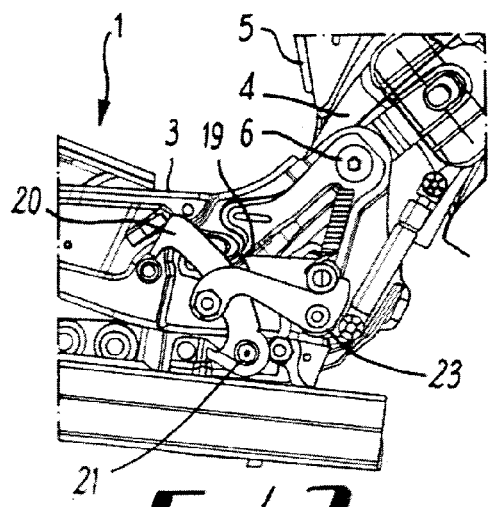
FIG. 3 shows the view of FIG. 2 with the seat in a mid-position.
Figure 4:
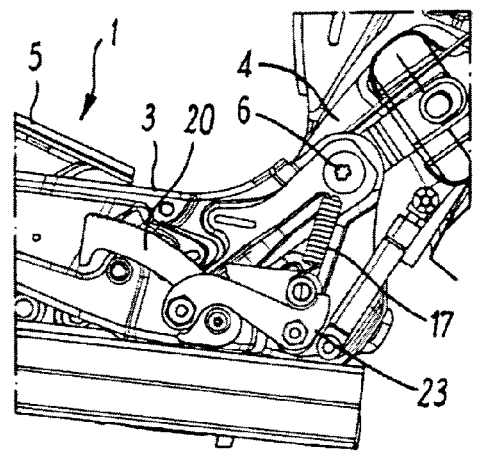
FIG. 4 shows the view of FIG. 3 with the seat in a fully lowered position.

When the seat is in its fully raised position, as shown in FIG. 2, the support bracket 23 supports the locking rack 20 in an upright position and the toothed edge 19 of the locking member is adjacent the free end of the locking rack 20. When the seat is in its lowermost position, as shown in FIG. 4, the free end of the locking rack 20 extends almost horizontally and the toothed edge 19 of the locking member 15 faces the toothed edge of the rack near to the pivot 21. Throughout the full range of height adjustment of the seat the distance between the toothed edge of the locking member 15 and the toothed edge 19 of the rack 20 is approximately constant.

In the event of an impact condition resulting in a force being exerted by the seat belt on the seat belt anchor point 14 sufficient to overcome tension in the resilient means 17 the locking means 15 will rotate until its toothed edge 19 contacts and engages with the toothed edge of the locking rack 20. As the locking member 15 is mounted to the cushion frame 3 and the rack 20 to the moveable rail 8 engagement of the locking member 15 and locking rack 20 serves to inhibit, and preferably substantially prevent, movement of the cushion frame 3 relative to the moveable rail 8 as a result of compliance in the seat height adjustment mechanism. As a result, under impact conditions, movement of the seat, and hence its occupant, relative to the vehicle as a result of compliance in the height adjustment mechanism is reduced. When force applied to the seat belt anchor point 14 reduces below a predetermined level, below which tension in the resilient means 17 is no longer overcome, the resilient means causes the locking member 15 to disengage from the locking rack 20 again allowing for heightwise adjustment of the seat.

The seat height adjustment mechanism is provided to the opposite side of the seat rails 8,9 to the locking member 15 and rack 20.

On the opposite side of the seat to the locking means 15 and rack 20 the cushion frame 3 is provided with an arcuate rack 24 extending partially around the pivot 6 between the cushion frame 3 and squab frame 4.

Mounted to the squab frame 4 is a locking arrangement, generally indicated by reference numeral 25, arranged to engage with the arcuate rack 24.

The locking arrangement comprises a locking pawl 26 mounted to the squab frame 4 by way of a pivot 27. The pawl comprises an arm having a toothed edge arranged to engage with the arcuate rack 24 when the locking pawl 26 is rotated in a clockwise direction (as viewed in FIGS. 6 to 8) about pivot 27. Movement of the locking pawl 26 is controlled by an associated locking plate 28 which cooperates with the locking pawl 26. The locking plate 28 is mounted to the squab frame 4 by pivot 29 from which it is freely suspended. The centre of gravity of the locking plate 28 is indicated at 30.

Figure 6:
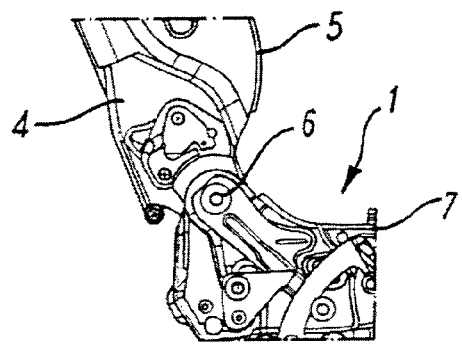
FIG. 6 shows a partial cut-away right side view of the seat of FIG. 1.
Figure 7:
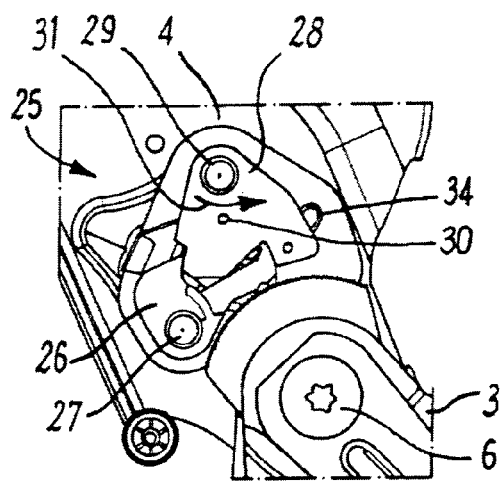
FIG. 7 shows a detailed view of the locking means shown in FIG. 6 in an unlocked state.
Figure 8:
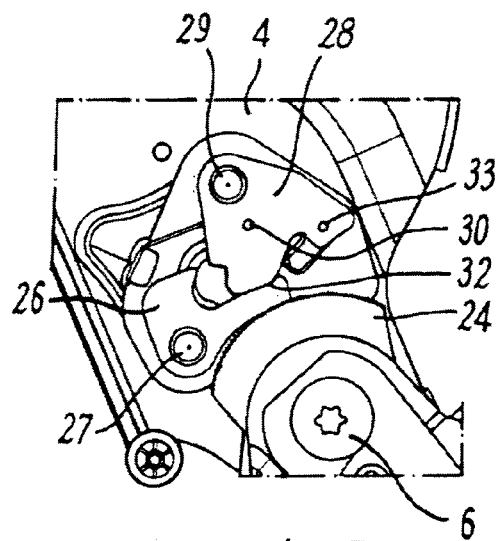
FIG. 8 shows the view of FIG. 7 with the locking means in a locked state.

For normal operation of the seat the locking plate 28 and locking pawl 26 are arranged in the configuration shown in FIGS. 6 and 7. In this configuration the centre of gravity 30 of the locking plate 28 lies substantially vertically below the pivot 29 and the locking plate 28 engages with the locking pawl 26 to retain the pawl 26 in a raised position such that the toothed edge of the pawl is separated from the arcuate rack 24. A calibration spring (not shown) holds the locking plate 28 in position. In the event of a vehicle impact rapid deceleration of the vehicle will result in inertial forces urging the centre of gravity 30 of the locking plate 28 in the direction indicated by arrow 31 in FIG. 7. This causes the locking plate 28 to swing forwards against the action of the calibration spring to the position illustrated in FIG. 8. On doing so the locking plate 28 releases the locking pawl 26 and bears against the locking pawl 26 urging the toothed edge of the pawl 26 into engagement with the arcuate rack 24. The surface 32 of the locking pawl 26 against which the locking plate 28 bears is shaped such that the locking plate 28 engages the locking pawl 26 with an over centre action so that the locking plate 28 and pawl 26 remain in the configuration illustrated in FIG. 8 following an impact.

Engagement of the locking pawl 26 with the arcuate rack 24 provides a connection between the cushion frame 3 and squab frame 4 inhibiting pivotal movement between the two frames about pivot 6 and thereby limiting forward movement of the seat squab 2 during a vehicle impact as a result of compliance in the seat squab adjustment mechanism.

The arcuate rack 24 and locking arrangement 25 are provided on the opposite side of the seat to the seat squab 2 adjustment mechanism thereby limiting the greater movement of that side of the seat squab 2 which would result if the locking means were not present.

The fact that the seat squab 2 locking arrangement remains locked after a vehicle impact could cause difficulties, in particular for a two door vehicle where the vehicle seat is arranged so that its squab 2 can be moved forward into a so-called "dumped" position to enable access to rear seats of the vehicle. To overcome this problem an arrangement for releasing the locking means is provided. A pin mounted (at point 33) to the reverse side of the locking plate 28 to that shown in FIGS. 6 to 8 projects from the plate and through an arcuate slot 34 in the squab frame 4. As is conventional with seats for two door vehicles a squab release latch is provided to enable the squab 2 to be released from the seat so that it can be moved to the dumped position. The squab release latch is released by operation of a squab release lever mounted on the seat. In this arrangement the squab release lever is arranged not only to operate the squab release latch but also to move the locking plate 28 from the locked position shown in FIG. 8 (if it is in that position) and return it to the normal position shown in FIG. 7 by moving the pin projecting from the locking plate 28. Thus, following a vehicle impact which has caused the locking plate 28 to engage with the locking pawl 26, the locking arrangement is unlocked on operation of the squab release lever enabling the squab to be moved to the dumped position allowing rear seat passengers to exit the vehicle or emergency services to gain access to the rear seats of the vehicle.

The above embodiments of the invention both act to reduce vehicle seat movement under vehicle impact conditions resulting from compliance in vehicle seat adjustment mechanisms. This allows for better function of vehicle occupant safety systems, improving vehicle occupant safety.

The above embodiments are described by way of example only. Many variations are possible without departing from the scope of the invention.

What is claimed is:

1. A vehicle seat comprising a seat squab pivotally connected, directly or indirectly, to a seat cushion, an adjustment mechanism enabling adjustment of the relative positions of the seat squab and seat cushion, at least one locking means, separate to the adjustment mechanism, arranged to lock the seat squab and seat cushion relative to each other when predetermined conditions are experienced, thereby restricting relative movement of the seat squab and seat cushion that arises from compliance in the adjustment mechanism, a squab release latch and a squab release lever, the squab release lever being operable to release the squab release latch to enable the seat squab to be pivoted relative to the seat cushion to a dumped position, wherein operation of the squab release lever also releases the locking means, if the locking means is arranged to lock the seat squab and the seat cushion relative to each other.

2. A vehicle seat as claimed in claim 1 wherein the or each locking means is arranged to engage in the event of a vehicle on which the seat is mounted being involved in an impact.

3. A vehicle seat as claimed in claim 1, wherein the or each locking means is arranged to engage in the event of deceleration of a vehicle on which the seat is mounted exceeding a predetermined value.

4. A vehicle seat as claimed in claim 1 wherein the or each locking means is resiliently biased against engagement.

5. A vehicle seat as claimed in claim 1 wherein the or each locking means comprises two mutually engageable components.

6. A vehicle seat as claimed in claim 5, wherein one of the two engageable components comprises teeth and the other comprises a pawl or teeth.

7. A vehicle seat as claimed in claim 1 wherein a component of the or each locking means is arranged to move from a first position to a second position as a result of inertial forces acting on the mass of the component resulting from deceleration of a vehicle in which the seat is mounted.

8. A vehicle seat as claimed in claim 1 wherein the or each locking means is arranged to continue to lock the seat squab and seat cushion relative to each other even though the predetermined conditions no longer apply.

9. A vehicle comprising a vehicle seat as claimed in claim 1.

10. A vehicle as claimed in claim 9, wherein the seat cushion is fixed relative to the vehicle.

11. A vehicle seat as claimed in clam 1 wherein, the adjustment mechanism is mounted to one side of the seat and the locking means is mounted to the opposite side of the seat.

12. A vehicle seat as claimed in claim 1 wherein, the adjustment mechanism is mounted to one side of the seat and the or each locking means is mounted to the opposite side of the seat.

13. A vehicle seat as claimed in claim 1 wherein the at least one locking means is comprised of a first locking member disposed between a frame of the seat cushion and a seat base, and a second locking member disposed between a frame of the seat squab and the frame of the seat cushion.

14. A vehicle seat as claimed in claim 13 wherein, in an impact condition of the vehicle, the first locking member inhibits movement of the seat cushion frame relative to the seat base, and the second locking member prevent forward movement of the seat squab frame.

15. A vehicle seat as claimed in claim 14 wherein the first locking member includes a plate member pivotally mounted to the seat cushion frame for cooperation with a locking rack pivotally mounted to a slide of the seat base.

16. A vehicle seat as claimed in claim 15 wherein the second locking member includes a locking pawl pivotally mounted to the seat squab frame for cooperation with a locking plate pivotally mounted to the seat squab frame.

17. A vehicle seat as claimed in claim 14 wherein the first locking member is disposed on an opposite side of the seat to the second locking member.

18. A vehicle seat comprising:
a seat cushion and frame;
a seat squab and frame pivotally connected to the seat cushion frame;
an adjustment mechanism enabling adjustment of the relative positions of the seat squab and seat cushion;
a first locking member disposed between a frame of the seat cushion and a seat base;
and a second locking member disposed between a frame of the seat squab and the frame of the seat cushion;
wherein, in an impact condition of the vehicle, the first locking member inhibits movement of the seat cushion frame relative to the seat base, and the second locking member prevent forward movement of the seat squab frame.;
a squab release latch and a squab release lever, the squab release lever being operable to release the squab release latch to enable the seat squab to be pivoted relative to the seat cushion to a dumped position, wherein operation of the squab release lever also releases the second locking member, if the second locking member is arranged to lock the seat squab and the seat cushion relative to each other.

19. A vehicle seat as claimed in claim 18 wherein the first locking member is disposed on an opposite side of the seat to the second locking member.

20. A vehicle seat as claimed in claim 19 wherein the first locking member includes a plate member pivotally mounted to the seat cushion frame for cooperation with a locking rack pivotally mounted to a slide of the seat base; and the second locking member includes a locking pawl pivotally mounted to the seat squab frame for cooperation with a locking plate pivotally mounted to the seat squab frame.

* * * * *